(12) United States Patent
Gu et al.

(10) Patent No.: US 10,085,028 B2
(45) Date of Patent: Sep. 25, 2018

(54) METHOD AND DEVICE FOR REDUCING A COMPUTATIONAL LOAD IN HIGH EFFICIENCY VIDEO CODING

(71) Applicants: Futurewei Technologies, Inc., Plano, TX (US); Santa Clara University, Santa Clara, CA (US)

(72) Inventors: Zhouye Gu, San Jose, CA (US); Jianhua Zheng, Beijing (CN); Nam Ling, San Jose, CA (US); Chen-Xiong Zhang, Plano, TX (US)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 219 days.

(21) Appl. No.: 14/752,043

(22) Filed: Jun. 26, 2015

(65) Prior Publication Data
US 2015/0381988 A1   Dec. 31, 2015

Related U.S. Application Data

(60) Provisional application No. 62/017,625, filed on Jun. 26, 2014, provisional application No. 62/027,386, filed on Jul. 22, 2014.

(51) Int. Cl.
*H04N 19/11* (2014.01)
*H04N 19/147* (2014.01)
(Continued)

(52) U.S. Cl.
CPC .......... *H04N 19/147* (2014.11); *H04N 19/11* (2014.11); *H04N 19/119* (2014.11); *H04N 19/176* (2014.11); *H04N 19/597* (2014.11)

(58) Field of Classification Search
CPC .................................................. H04N 19/147
See application file for complete search history.

(56) References Cited

U.S. PATENT DOCUMENTS 6,037,987 A * 3/2000 Sethuraman ......... H04N 19/176
                                                      375/240.03
8,144,770 B2 * 3/2012 Kim ..................... H04N 19/107
                                                      375/240.12
(Continued)

FOREIGN PATENT DOCUMENTS

JP          2013153515          8/2013

OTHER PUBLICATIONS

Zhang et al, Interlayer Simplified Depth Coding for Quality Scalability on 3D High Efficiency Video Coding, Mar. 2014.*
(Continued)

*Primary Examiner* — Jay Patel
*Assistant Examiner* — Irfan Habib
(74) *Attorney, Agent, or Firm* — Schwegman Lundberg & Woessner, P.A.

(57) ABSTRACT

A method for reducing a computational load in high efficiency video coding includes generating a full rate distortion calculation list of selected intra coding modes where the intra coding modes including intra prediction modes and depth modeling modes. A rate distortion cost is determined, with a segment-wise depth coding mode being disabled, for each intra prediction mode in the full rate distortion calculation list and a smallest rate distortion cost intra prediction mode is selected. A rate distortion cost for a particular intra prediction mode is calculated with the segment-wise depth coding mode enabled. After comparison, one of the particular intra prediction mode and the smallest rate distortion cost intra prediction mode having the smallest rate distortion cost is applied to a prediction unit.

22 Claims, 8 Drawing Sheets

(51) Int. Cl.
*H04N 19/176* (2014.01)
*H04N 19/119* (2014.01)
*H04N 19/597* (2014.01)

(56) References Cited

U.S. PATENT DOCUMENTS

| | | | | |
|---|---|---|---|---|
| 9,247,249 B2* | 1/2016 | Chen | | H04N 19/597 |
| 9,432,668 B1* | 8/2016 | Bossen | | H04N 19/107 |
| 9,503,723 B2* | 11/2016 | Gu et al. | | H04N 19/597 |
| 9,615,085 B2* | 4/2017 | Wang | | H04N 19/12 |
| 9,756,359 B2* | 9/2017 | Zhao | | H04N 19/597 |
| 9,848,201 B2* | 12/2017 | Jia | | H04N 19/597 |
| 2005/0135484 A1* | 6/2005 | Lee | | H04N 19/176 375/240.16 |
| 2006/0088099 A1* | 4/2006 | Gao | | H04N 19/176 375/240.16 |
| 2007/0140339 A1* | 6/2007 | Bhaskaran | | H04N 19/176 375/240.12 |
| 2010/0135416 A1* | 6/2010 | Huang | | H04N 19/91 375/240.24 |
| 2010/0290526 A1 | 11/2010 | Tong et al. | | |
| 2011/0243225 A1* | 10/2011 | Min | | H04N 19/44 375/240.12 |
| 2011/0317757 A1* | 12/2011 | Coban | | H04N 19/197 375/240.02 |
| 2012/0008675 A1* | 1/2012 | Karczewicz | | H04N 19/159 375/240.02 |
| 2012/0170649 A1 | 7/2012 | Chen et al. | | |
| 2012/0177118 A1* | 7/2012 | Karczewicz | | H04N 19/137 375/240.13 |
| 2012/0183066 A1* | 7/2012 | Oh | | H04N 19/132 375/240.13 |
| 2012/0320974 A1* | 12/2012 | Li | | H04N 19/159 375/240.12 |
| 2013/0002816 A1* | 1/2013 | Hannuksela | | G06T 9/00 348/43 |
| 2013/0022119 A1* | 1/2013 | Chien | | H04N 19/159 375/240.16 |
| 2013/0044806 A1* | 2/2013 | Huang | | H03M 7/4006 375/240.02 |
| 2013/0163664 A1* | 6/2013 | Guo | | H04N 19/00793 375/240.12 |
| 2013/0265388 A1* | 10/2013 | Zhang | | H04N 13/0048 348/43 |
| 2013/0266064 A1* | 10/2013 | Zhang | | H04N 19/50 375/240.12 |
| 2013/0272385 A1* | 10/2013 | Yu | | H04N 19/147 375/240.03 |
| 2013/0301725 A1* | 11/2013 | Wang | | H04N 19/597 375/240.16 |
| 2014/0219342 A1* | 8/2014 | Yu | | H04N 19/50 375/240.12 |
| 2014/0219349 A1* | 8/2014 | Chien | | H04N 19/105 375/240.13 |
| 2014/0294061 A1* | 10/2014 | Zhang | | H04N 19/597 375/240.02 |
| 2015/0110174 A1* | 4/2015 | Gu | | H04N 19/105 375/240.03 |
| 2015/0172717 A1* | 6/2015 | Zhao | | H04N 19/597 375/240.16 |
| 2015/0245061 A1* | 8/2015 | Chen | | H04N 19/597 375/240.13 |
| 2015/0245068 A1* | 8/2015 | Kim | | H04N 19/147 375/240.12 |
| 2015/0350677 A1* | 12/2015 | Lim | | H04N 19/463 375/240.12 |
| 2015/0382025 A1* | 12/2015 | Gu | | H04N 19/182 375/240.24 |
| 2016/0309173 A1* | 10/2016 | Lee | | H04N 19/70 |
| 2016/0316200 A1* | 10/2016 | Zhang | | H04N 19/597 |
| 2016/0330479 A1* | 11/2016 | Liu | | H04N 19/597 |
| 2016/0330480 A1* | 11/2016 | Liu | | H04N 13/0048 |
| 2017/0006309 A1* | 1/2017 | Liu | | H04N 19/176 |

OTHER PUBLICATIONS

Gu et al. Simplified Depth Intra Mode Selection for 3D Video Compression, Jun. 2014.*
"International Application No. PCT/US2015/038042, International Search Report and Written Opinion dated Sep. 16, 2015", (Sep. 16, 2015), 9 pgs.
Gu, Zhouye, et al., "Simplified Depth Intra Mode Selection for 3D Video Compression", IEEE International Symposium on Circuits and Systems, Jun. 1-5, 2014 (retrieved on Aug. 26, 2015), retrieved at http://ieeexplore.ieee.org/xpls/abs_all.jsp?arnumber=6865334, (Jun. 1, 2014), 4 pgs.
Jaeger, Fabian, "3D-CE6.h: Simplified Depth Coding with an optional Depth Lookup Table", Joint Collaborative Team on 3D Video Coding Extension Development of ITU-T SG 16 WP 3 and ISO/IEC JTC 1/SC 29/WG 11; 2nd Meeting: Shanghai, CN, Oct. 13-19, 2012, (Oct. 13, 2012), 16 pgs.
Khan, Muhammed Usman Karim, et al., "An Adaptive Complexity Reduction Scheme With Fast Prediction Unit Decision for HEVC Intra Encoding", 20th IEEE International Conference on Image Processing, Sep. 15-18, 2013 (retrieved on Aug. 26, 2015); retrieved at http://f4k.dieei.unict.it/proceedings/ICIP2013/pdfs/0001578.pdf, (Sep. 15, 2013), 1578-1582.
Mueller, Karsten, et al., "3D Video Coding with Depth Modeling Modes and View Synthesis Optimization", Proceedings of APSIPA Annual Summit and Conference 2012, Hollywood, CA, USA, Dec. 2012, (Dec. 2012).
Song, Yunseok, et al., "Unified depth intra coding for 3D video extension of HEVC", Jan. 11, 2014 (retrieved on Aug. 26, 2015), retrieved from https://vclab.gist.ac.kr/papers/01/2014/SIVP_YunseokSong.pdt, (Jan. 11, 2014), 7 pgs.
Tech, G., et al., ""3D-HEVC Test Model 7" in JCT3V-G1005", San Jose, California (USA), Jan. 11-17, 2014, (Jan. 11, 2014).
Zhang, Mengmeng, et al., "Interlayer Simplified Depth Coding for Quality Scalability on 3D High Efficiency Video Coding", The Scientific World Journal, vol. 2014, Article ID 841608, (Mar. 16, 2014), 5 pgs.
Zhang, Qiuwen, et al., "Fast Mode Decision for 3D-HEVC Depth Intracoding", The Scientific World Journal, vol. 2014, Article ID 620142, (May 19, 2014), 9 pgs.
"Japanese Application No. 2017-520758, Decision to Grant a Patent dated Jan. 30, 2018", (Jan. 30, 2018), 6 pgs.
Yu, Qin, et al., "CE6.h related: Unification of new intra modes in 3D-HEVC", Joint Collaborative Team on 3D Video Coding Extensions of ITU-T SG 16 WP 3 and ISO/IEC JTC1/SC 29/WG 11 4th Meeting: Incheon, KR, Apr. 20-26, 2013, JCT3V-D0195, (Apr. 20, 2013), 20 pgs.

* cited by examiner

METHOD AND DEVICE FOR REDUCING A COMPUTATIONAL LOAD IN HIGH EFFICIENCY VIDEO CODING

CROSS-REFERENCE TO RELATED APPLICATIONS

This application claims the benefit of U.S. Provisional Application No. 62/017,625 filed Jun. 26, 2014 entitled METHOD OF INTRA SDC CODING and U.S. Provisional Application No. 62/027,386 filed Jul. 22, 2014 entitled METHOD OF INTRA SDC CODING, which are hereby incorporated herein by reference as if reproduced in its entirety.

TECHNICAL FIELD

This disclosure relates in general to High Efficiency Video Coding techniques and more particularly to a method and device for reducing a computational load in High Efficiency Video Coding (HEVC).

BACKGROUND

During the 3D-HEVC intra prediction process, the intra prediction mode decision is performed using all possible intra coding modes to find the one with the least rate distortion (RD) cost using a Lagrange multiplier. However, this technique results in extremely large computational complexity and limits the use of 3D-HEVC encoders and decoders in practical applications. Therefore, fast algorithms, which can reduce the complexity of intra decision without compromising coding efficiency, are very desirable for real-time implementation of 3D-HEVC encoders and decoders.

SUMMARY

From the foregoing, it may be appreciated by those skilled in the art that a need has arisen to reduce the computational complexity in three dimensional video encoders and decoders. In accordance with the present disclosure, a method and device for reducing a computational load in high efficiency video coding are provided that greatly reduce and substantially eliminate the problems associated with conventional encoder and decoder processing implementations.

According to an embodiment, a method for reducing a computational load in high efficiency video coding includes generating a full rate distortion calculation list of selected intra coding modes where the intra coding modes including intra prediction modes and depth modeling modes. A rate distortion cost is determined for each intra prediction mode in the full rate distortion calculation list and a smallest rate distortion cost intra prediction mode having a smallest rate distortion cost is selected, wherein a segment-wise depth coding mode is disabled for each intra prediction mode in the determination. A rate distortion cost for a particular intra prediction mode is calculated with the segment-wise depth coding mode enabled. The rate distortion cost of the particular intra prediction mode obtained for the segment-wise depth coding mode being enabled is compared to the rate distortion cost of the smallest rate distortion cost intra prediction mode obtained for the segment-wise depth coding mode being disabled. One of the particular intra prediction mode and the smallest rate distortion cost intra prediction mode having the smallest rate distortion cost is applied to a prediction unit.

The present disclosure describes many technical advantages over conventional video encoding techniques. For example, one technical advantage is to eliminate performing a full rate distortion calculation when enabling a segment-wise depth coding mode. Another technical advantage is to select particular intra coding modes for rate distortion calculation. Yet another technical advantage is base selection of an intra coding mode on an intra prediction mode with a smallest rate distortion cost. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

In general, this disclosure relates to techniques for encoding and decoding depth data for three-dimensional (3D) video data using various depth coding modes under the HEVC standard. Captured views (e.g., textures) of the 3D video data are associated with corresponding depth maps that describe depth data for the texture data. In accordance with a 3D video coding process, such as a 3D-HEVC process, the texture views and depth maps may be coded and multiplexed into a 3D video bitstream.

Figure 1:
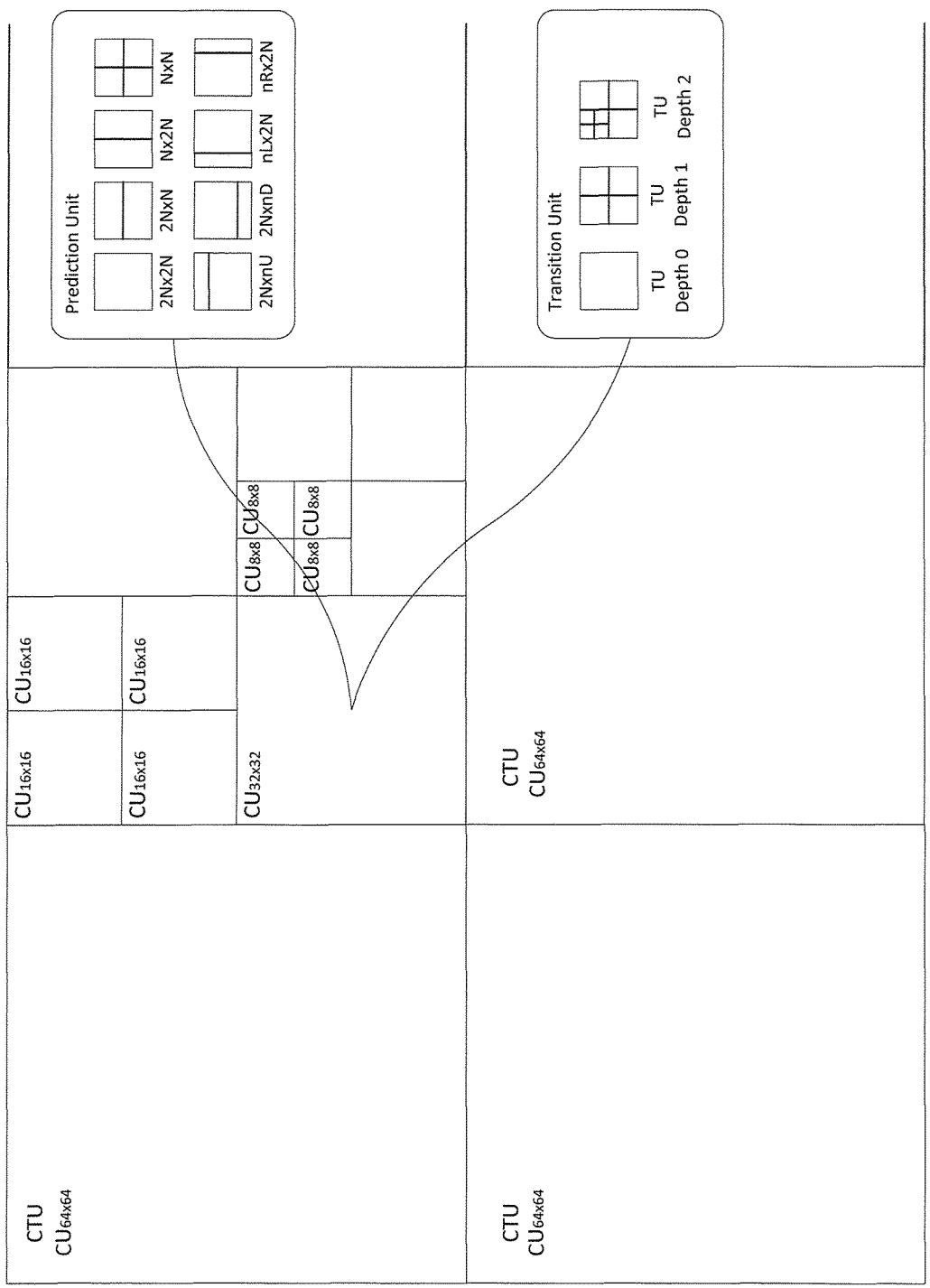
FIG. 1 shows a quadtree coding structure implemented in High Efficiency Video Coding (HEVC)

FIG. 1 shows a quadtree coding structure implemented in High Efficiency Video Coding (HEVC). The HEVC standard employs a highly flexible quadtree coding structure where a video picture or frame may be divided into a sequence of Coding Tree Units (CTU) that include luma (Y) and chroma (Cb, Cr) samples. The CTU size can be selected from 64×64, 32×32, and 16×16 in the encoder and specified in a sequence parameter set (SPS). A CTU is employed as the root of the coding tree and each leaf of the quadtree is called a Coding Unit (CU). Therefore, one CTU can be partitioned into multiple CUs and each CU specifies one coding category, either intra coding or inter coding. A CU is further split into one, two, or four Prediction Units (PU) that carry the basic information for prediction. For efficient prediction, HEVC defines two intra PU and eight inter PU shapes to support variable size PU. Intra PUs may have 2N×2N and N×N shapes. Inter PU shapes include two square shapes 2N×2N and N×N, two rectangular shapes 2N×N and N×2N, and four asymmetric shapes 2N×nU, 2N×nD, nL×2N, and nR×2N in up, down, left, and right positions respectively. The residual block of each CU can be transformed with a quadtree structure usually called a residual quadtree (RQT) made up of Transfer Units (TU) ranging in size from 4×4 up to 32×32. A TU contains coefficients for spatial block transform and quantization for coding a residual difference between the predicted image and the actual image.

The encoder selects the best coding tree structure, PU subdivision, and RQT configuration through exhaustive computations. For evaluating the compression efficiency of each candidate configuration, the encoder usually employs the Lagrangian multiplier optimization technique, which is expressed by $J=D+\lambda R$, where J is the Lagrangian rate distortion (RD) cost function, D is distortion gain by the sum of square errors of the reconstructed samples against the originals, R is bit-rate of entropy coding, and $\lambda$ is the Lagrangian multiplier connecting R and D in a Lagrangian formulation. The minimization process of the RD cost is known as rate-distortion optimization (RDO) through which bit-rate makes peace with distortion, leading to a trade-off between compression efficiency and picture quality.

Coding efficiency is the ability to encode video at the lowest possible bit rate while maintaining a certain level of video quality. The encoder uses RDO processing to choose the intra coding mode with the minimum value. RDO processing is very time-consuming mainly for two reasons. The first one is that there are too many CU/PU/TU combinations. For example, in intra prediction mode coding only, 35 times of RD cost computation process is performed to decide the mode of a certain PU, since one PU may be coded with one of 35 intra prediction modes containing DC (flat), Planar (surface fitting), and 33 angular modes. The second reason is that the RD-cost calculation is computational intensive. To obtain accurate D and R, for each candidate, the RD-cost computation performed by the encoder encompasses intra prediction, residual calculating, transform, quantization, the entropy coding, inverse transform, inverse quantization, pixel reconstruction, and finally the RD-cost computing.

In general, the HEVC encoder compresses the frames into a compressed video bit stream which can be stored or transmitted. The encoding process begins by partitioning a single picture or frame into multiple CTUs which can be further divided into multiple CUs. Once the picture in the frame has been partitioned, the predicting processes begin where a CU is partitioned further into PUs. The HEVC encoder uses two types of predictions namely intra prediction and inter prediction. Intra prediction predicts PUs from neighboring image data, i.e. from the same picture frame. Inter prediction uses motion compensated prediction to predict PUs referenced from image data in pictures found before or after the current display, i.e. other picture frames in the stream. Any data remaining after prediction is put into a block using a Discrete Cosine Transform (DCT). The difference between the original block and its prediction is transformed by a linear spatial transform. The HEVC encoder applies these blocks to the remaining data in each CU. Finally, the coded bit stream is encoded further using Context Adaptive Binary Arithmetic Coding (CABAC) through a process known as Entropy encoding. This is the final step where the HEVC encoder arranges and compresses the transformed data into its separate components, namely motion vectors, prediction modes, partitioning information, and other header data. Upon being scaled, quantized, and entropy coded, the transform coefficients are transmitted together with the prediction information. At this point the video has been compressed and can be stored.

Upon video transmission, a HEVC decoder decodes the data in order to view images from a video source. By entropy decoding, the HEVC decoder extracts the elements of the encoded sequence. It rescales and inverts the transform stage of the encoding process, units of the picture are restored to their original form, predicted, and the predictions are added to the output of the inverse transform.

The final step to viewing the motion picture is the process of reconstruction of the decoded video for viewing. The encoder duplicates the decoder processing loop such that both will generate identical predictions for subsequent data. The quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures.

Figure 2:
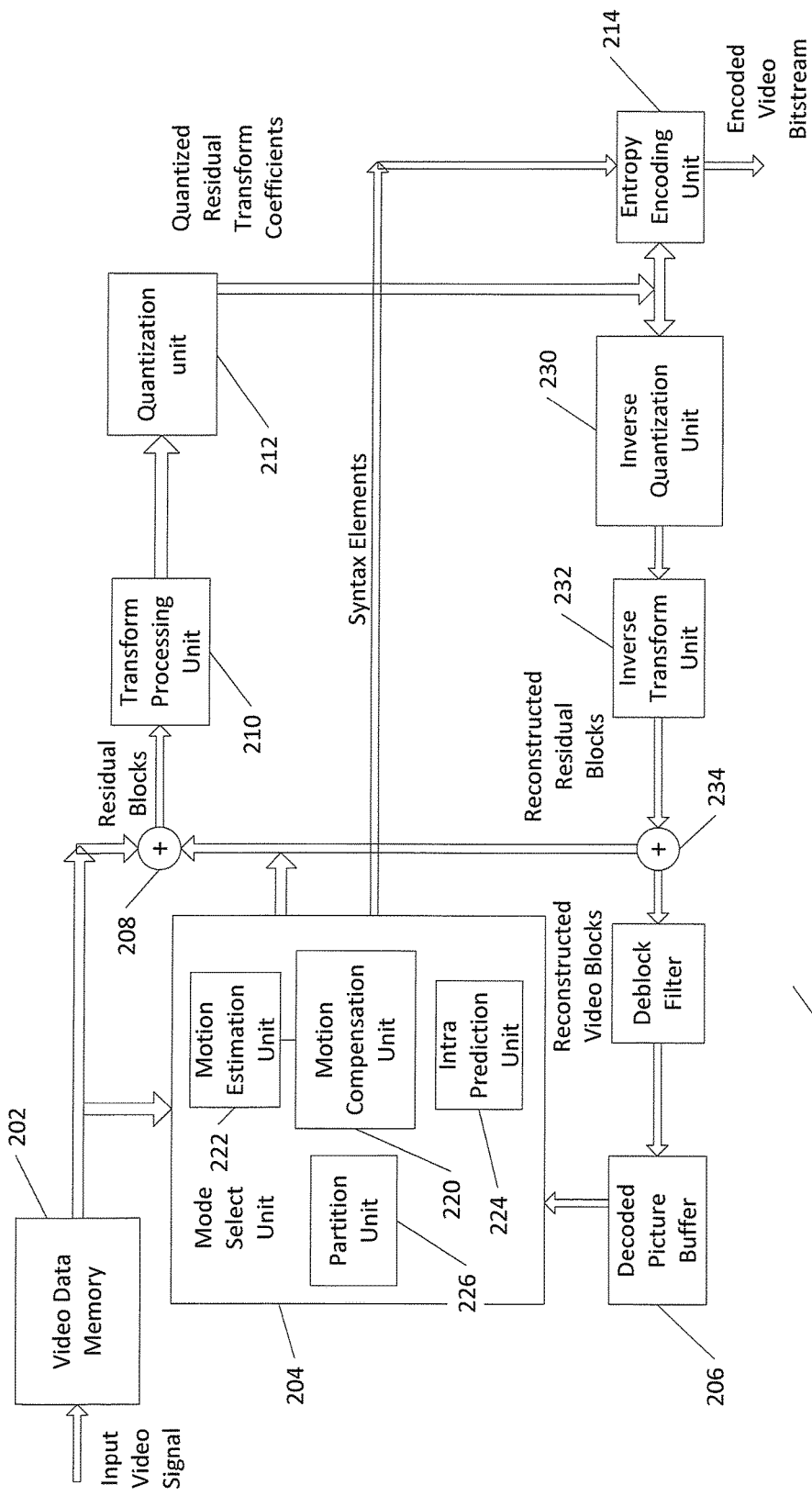
FIG. 2 is a block diagram illustrating an example of a video encoder that may implement techniques for depth data coding.

FIG. 2 is a block diagram illustrating an example of a video encoder 200 that may implement techniques for depth data coding. Video encoder 200 is representative of a device that may be configured to perform techniques for simplified coding modes signaling of depth maps in 3D-HEVC as disclosed herein. Video encoder 200 may perform intra and inter coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra prediction mode (I mode) may refer to any of several spatial based coding modes. Inter prediction modes, such as uni-directional prediction (P mode) or bi-prediction (B mode), may refer to any of several temporal-based coding modes. In addition to encoding texture maps (i.e., luma and chroma values) for each view, video encoder 200 may further encode a depth map for each view.

Video encoder 200 may include a video data memory 202, a mode select unit 204, decoded picture buffer (DPB) 206, summer 208, transform processing unit 210, quantization unit 212, and an entropy encoding unit 214. Mode select unit 204, in turn, includes motion compensation unit 220, motion estimation unit 222, intra prediction unit 224, and partition unit 226. For video block reconstruction, video encoder 20 also includes inverse quantization unit 230, inverse transform unit 232, and summer 234. A deblocking filter 240 may also be included to filter block boundaries and remove blockiness artifacts from reconstructed video. If desired, the deblocking filter 240 would typically filter the output of summer 234. Additional filters (in loop or post loop) may also be used in addition to the deblocking filter. Such filters may filter the output of summer 208 (as an in-loop filter).

Example filters may include adaptive loop filters, sample adaptive offset (SAO) filters, or other types of filters.

Video encoder 200 receives a current video block within a video frame to be encoded. Video data memory 202 may store video data to be encoded by the components of video encoder 200. The video data stored in video data memory 202 may be obtained, for example, from a video source. Decoded picture buffer 206 may be a reference picture memory that stores reference video data for use in encoding video data by video encoder 200, e.g., in intra or inter coding modes. Video data memory 202 and decoded picture buffer 206 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 202 and decoded picture buffer 206 may be provided by the same memory device or separate memory devices. In various examples, video data memory 202 may be on-chip with other components of video encoder 200 or off-chip relative to those components.

During the encoding process, video encoder 200 receives a video frame or slice to be coded. The frame or slice may be divided into multiple video blocks. Motion estimation unit 222 and motion compensation unit 220 perform inter-predictive coding of the received video block relative to one or more blocks in one or more reference frames to provide temporal prediction. Intra prediction unit 224 may alternatively perform intra predictive coding of the received video block relative to one or more neighboring blocks in the same frame or slice as the block to be coded to provide spatial prediction. Video encoder 200 may perform multiple coding passes to select an appropriate coding mode for each block of video data.

Moreover, partition unit 226 may partition blocks of video data into sub-blocks, based on evaluation of previous partitioning schemes in previous coding passes. For example, partition unit 226 may initially partition a frame or slice into LCUs, and partition each of the LCUs into sub-CUs based on rate-distortion analysis (e.g., rate-distortion optimization). Mode select unit 204 may further produce a quadtree data structure indicative of partitioning of an LCU into sub-CUs. Leaf-node CUs of the quadtree may include one or more PUs and one or more TUs. Mode select unit 204 may select one of the coding modes, intra or inter, based on error results and provide the resulting intra or inter coded block to summer 208 to generate residual block data and to summer 234 to reconstruct the encoded block for use as a reference frame. Mode select unit 204 also provides syntax elements, such as motion vectors, intra coding mode indicators, partition information, and other such syntax information, for entropy encoding unit 214.

Motion estimation unit 222 and motion compensation unit 220 may be highly integrated, but are illustrated separately for conceptual purposes. Motion estimation, performed by motion estimation unit 222, is the process of generating motion vectors that estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 200 may calculate values for sub-integer pixel positions of reference pictures stored in decoded picture buffer 206. For example, video encoder 200 may interpolate values of one-quarter pixel positions, one-eighth pixel positions, or other fractional pixel positions of the reference picture. Therefore, motion estimation unit 222 may perform a motion search relative to the full pixel positions and fractional pixel positions and output a motion vector with fractional pixel precision.

Motion estimation unit 222 calculates a motion vector for a PU of a video block in an inter-coded slice by comparing the position of the PU to the position of a predictive block of a reference picture. The reference picture may be selected from one of a plurality of reference picture lists, each of which identify one or more reference pictures stored in decoded picture buffer 206. Motion estimation unit 222 generates the calculated motion vector for entropy encoding unit 214 and motion compensation unit 220.

Motion compensation, performed by motion compensation unit 220, may involve fetching or generating the predictive block based on the motion vector determined by motion estimation unit 222. Upon receiving the motion vector for the PU of the current video block, motion compensation unit 220 may locate the predictive block to which the motion vector points in one of the reference picture lists. Summer 208 forms a residual video block by subtracting pixel values of the predictive block from the pixel values of the current video block being coded, forming pixel difference values. In general, motion estimation unit 222 performs motion estimation relative to luma components, and motion compensation unit 220 uses motion vectors calculated based on the luma components for both chroma components and luma components. Mode select unit 204 may also generate syntax elements associated with the video blocks and the video slice for use in decoding the video blocks of the video slice.

Intra prediction unit 224 may intra predict a current block, as an alternative to the inter prediction performed by motion estimation unit 222 and motion compensation unit 220. In particular, intra prediction unit 224 may determine an intra coding mode to use to encode a current block. In some examples, intra prediction unit 224 may encode a current block using various intra prediction modes, e.g., during separate encoding passes, and intra prediction unit 224 (or mode select unit 204, in some examples) may select an appropriate intra coding mode to use from the tested modes.

For example, intra prediction unit 224 may calculate rate-distortion values using a rate-distortion analysis for the various tested intra coding modes and select the intra coding mode having the best rate-distortion characteristics among the tested modes. Rate-distortion analysis generally determines an amount of distortion (or error) between an encoded block and an original unencoded block, which was encoded to produce the encoded block, as well as a bitrate or number of bits used to produce the encoded block. Intra prediction unit 224 may calculate ratios from the distortions and rates for the various encoded blocks to determine which intra coding mode exhibits the best rate-distortion value for the block.

In addition, intra prediction unit 224 may be configured to code depth blocks of a depth map. For example, intra prediction unit 224 may use intra prediction modes from the base (2D) HEVC standard, a region boundary chain coding mode (CCM), a simplified or segment-wise depth coding mode (SDC), or a depth modeling mode (DMM) to code an intra predicted PU of a depth slice. In some examples, motion estimation unit 222 and motion compensation unit 220 may also be configured to code depth blocks of a depth map. Motion estimation unit 222 and motion compensation unit 220 may perform inter prediction according to the base (2D) HEVC standard or an Inter SDC mode to code an inter predicted PU of a depth slice.

Transform processing unit 210 applies the transform to the residual block, producing a block of residual transform coefficients. The transform may convert the residual information from a pixel value domain to a transform domain, such as a frequency domain. Transform processing unit 210 may perform transforms such as discrete cosine transforms (DCTs) or other transforms that are conceptually similar to DCT. Wavelet transforms, integer transforms, sub-band transforms, or other types of transforms could also be used. Transform processing unit 210 may send the resulting transform coefficients to quantization unit 212. In some examples, the transform process may be skipped.

Quantization unit 212 quantizes the transform coefficients to further reduce bit rate. The quantization process may reduce the bit depth associated with some or all of the coefficients. The degree of quantization may be modified by adjusting a quantization parameter. In some examples, quantization unit 212 may then perform a scan of the matrix including the quantized transform coefficients. Alternatively, entropy encoding unit 214 may perform the scan.

Following quantization, entropy encoding unit 214 entropy codes the quantized transform coefficients. For example, entropy encoding unit 214 may perform context adaptive binary arithmetic coding (CABAC) or other entropy coding processes, such as context adaptive variable length coding (CAVLC), syntax-based context-adaptive binary arithmetic coding (SBAC), or probability interval partitioning entropy (PIPE) coding. In the case of context-based entropy coding, context may be based on neighboring blocks. Following the entropy coding by entropy encoding unit 214, the encoded bitstream may be transmitted to another device (e.g., video decoder 300) or archived for later transmission or retrieval.

Inverse quantization unit 230 and inverse transform unit 232 apply inverse quantization and inverse transformation, respectively, to reconstruct the residual block in the pixel domain for later use as a reference block. Motion compensation unit 220 may calculate a reference block by adding the residual block to a predictive block of one of the frames of decoded picture buffer 206. Motion compensation unit 220 may also apply one or more interpolation filters to the reconstructed residual block to calculate sub-integer pixel values for use in motion estimation.

Summer 234 adds the reconstructed residual block to the motion compensated prediction block produced by motion compensation unit 220 to produce a reconstructed video block for storage in decoded picture buffer 206. The reconstructed video block may be used by motion estimation unit 222 and motion compensation unit 220 as a reference block to inter-code a block in a subsequent video frame.

According to the techniques described in this disclosure, video encoder 200 may be configured to encode depth data for 3D video data using depth intra coding modes available in a 3D video coding process. In one example, video encoder 200 signals depth intra coding modes used to code depth data for 3D video data in a depth modeling table. The depth modeling table signals the syntax for the additional depth intra coding modes separate from the syntax for the HEVC intra coding modes. In addition, video encoder 200 signals a syntax element, such as a flag, to indicate whether any of the depth intra coding modes that are different from the HEVC intra coding modes are enabled for the 3D video data. In some examples, the syntax element may indicate whether all of the depth intra coding modes are enabled for the 3D video data. The syntax element may be included in one of a video parameter set (VPS), a sequence parameter set (SPS), or a picture parameter set (PPS) of the video data. When the depth intra coding modes are enabled, the flag signaled by video encoder 200 indicates to video decoder 300 to decode the depth modeling table to determine the one of the depth intra coding modes used to code the depth data. The depth modeling table may be encoded at one of a coding unit (CU) level or a prediction unit (PU) level of the video data. The signaling of video encoder 200, in accordance with the techniques of this disclosure, may reduce the decoder parsing burden by signaling the depth intra coding modes in the depth modeling table separate from the HEVC intra coding modes and indicating when the depth intra coding modes are enabled and the depth modeling table be decoded.

In another example, video encoder 200 may be configured to signal residual information of depth data for 3D video data using a set of syntax elements unified across two or more of the depth coding modes. The depth coding modes may include the depth intra coding modes and the depth inter coding mode. The set of syntax elements may include a syntax element that indicates whether residual values are coded for any of the depth coding modes. The set of syntax elements may also include syntax elements that indicate an absolute value and a sign of residual values for any of the depth coding modes. By sharing the same set of syntax elements to indicate residual information for two or more of the depth coding modes, video encoder 200 may also unify context model selection and binarization methods for each of the shared syntax elements. In addition, for the depth intra coding modes, video encoder 200 may determine to not filter neighboring reference samples during generation of the residual values of the depth data. The encoding mechanisms and signaling of video encoder 200, in accordance with the techniques of this disclosure, may reduce decoder parsing burden and reduce a number of required context models and binarization methods by unifying the residual information syntax for the depth coding modes.

Figure 3:
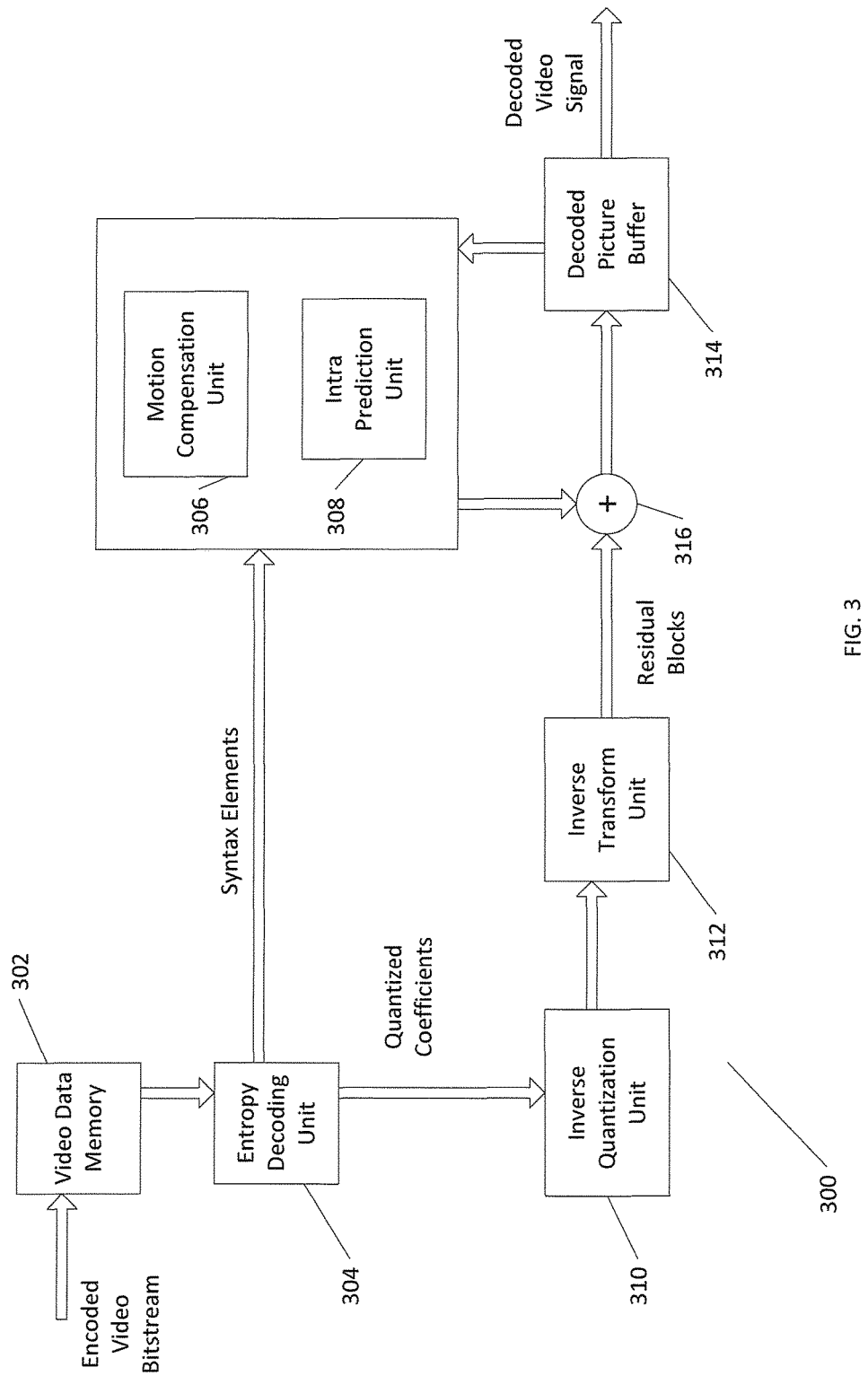
FIG. 3 is a block diagram illustrating an example of a video decoder that may implement techniques for depth data coding.

FIG. 3 is a block diagram illustrating an example of video decoder 300 that may implement techniques for depth data coding. Video decoder 300 includes a video data memory 302, an entropy decoding unit 304, a motion compensation unit 306, an intra prediction unit 308, an inverse quantization unit 310, an inverse transform unit 312, a decoded picture buffer (DPB) 314, and a summer 316. Video decoder 300 represents a device that may be configured to perform techniques for simplified coding modes signaling of depth maps in 3D-HEVC as provided herein.

Video data memory 302 may store video data, such as an encoded video bitstream, to be decoded by the components of video decoder 300. The video data stored in video data memory 302 may be obtained, for example, from a computer-readable medium, e.g., from a local video source, such as a camera, via wired or wireless network communication of video data, or by accessing physical data storage media. Video data memory 302 may form a coded picture buffer (CPB) that stores encoded video data from an encoded video bitstream. Decoded picture buffer 314 may be a reference picture memory that stores reference video data for use in decoding video data by video decoder 300 by intra or inter coding modes. Video data memory 302 and decoded picture buffer 314 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 302 and decoded picture buffer 314 may be provided by the same memory device or separate memory devices. In various examples, video data memory 302 may be on-chip with other components of video decoder 300, or off-chip relative to those components.

During the decoding process, video decoder 300 receives an encoded video bitstream that represents video blocks of an encoded video slice and associated syntax elements from video encoder 200. Entropy decoding unit 304 entropy decodes the bitstream to generate quantized coefficients, motion vectors, intra coding mode indicators, and other syntax elements. Video decoder 300 may receive the syntax elements at the video slice level and/or the video block level. In addition to decoding texture maps (i.e., luma and chroma values) for each view, video decoder 300 may further decode a depth map for each view.

When a video slice is coded as an intra coded (I) slice, intra prediction unit 308 may generate prediction data for a video block of the current video slice based on a signaled intra coding mode and data from previously decoded blocks of the current frame or picture. Intra prediction unit 308 may also intra code depth data. For example, intra prediction unit 308 may use intra prediction modes from the base (2D) HEVC standard, a region boundary chain coding mode (CCM), a simplified depth coding or segment-wise DC coding (SDC) mode, or a depth modeling mode (DMM) to code an intra predicted PU of a depth slice.

When the video frame is coded as an inter-coded (i.e., B or P) slice, motion compensation unit 306 produces predictive blocks for a video block of the current video slice based on the motion vectors and other syntax elements received from entropy decoding unit 304. The predictive blocks may be produced from one of the reference pictures within one of the reference picture lists. Video decoder 300 may construct the reference frame lists using default construction techniques based on reference pictures stored in decoded picture buffer 314.

Motion compensation unit 306 determines prediction information for a video block of the current video slice by parsing the motion vectors and other syntax elements, and uses the prediction information to produce the predictive blocks for the current video block being decoded. For example, motion compensation unit 306 uses some of the received syntax elements to determine a prediction mode (e.g., intra or inter prediction) used to code the video blocks of the video slice, an inter-prediction slice type (e.g., B slice or P slice), construction information for one or more of the reference picture lists for the slice, motion vectors for each inter encoded video block of the slice, inter-prediction status for each inter-coded video block of the slice, and other information to decode the video blocks in the current video slice.

Motion compensation unit 306 may also perform interpolation based on interpolation filters. Motion compensation unit 306 may use interpolation filters as used by video encoder 200 during encoding of the video blocks to calculate interpolated values for sub-integer pixels of reference blocks. In this case, motion compensation unit 306 may determine the interpolation filters used by video encoder 200 from the received syntax elements and use the interpolation filters to produce predictive blocks. Motion compensation unit 306 may also inter code depth data. For example, motion compensation unit 306 may perform inter prediction according to the base (2D) HEVC standard or an Inter SDC mode to code an intra predicted PU of a depth slice.

Inverse quantization unit 310 inverse quantizes, i.e., de-quantizes, the quantized transform coefficients provided in the bitstream and decoded by entropy decoding unit 304. The inverse quantization process may include use of a quantization parameter $QP_Y$ calculated by video decoder 300 for each video block in the video slice to determine a degree of quantization and, likewise, a degree of inverse quantization that should be applied. Inverse transform unit 312 applies an inverse transform, e.g. an inverse DCT, an inverse integer transform, or a conceptually similar inverse transform process, to the transform coefficients in order to produce residual blocks in the pixel domain.

After motion compensation unit 306 or intra prediction unit 308 generates the predictive block for the current video block (e.g. a texture block or a depth block) based on motion vectors or other syntax elements, video decoder 300 forms a decoded video block by summing the residual blocks from inverse transform unit 312 with the corresponding predictive blocks generated by motion compensation unit 306 or intra prediction unit 308. Summer 316 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 314, which stores reference pictures used for subsequent motion compensation. Decoded picture buffer 314 also stores decoded video for later presentation on a display device.

In one example, video decoder 300 decodes syntax elements indicating depth intra coding modes used to code depth data for 3D video data in a depth modeling table. The depth modeling table includes the syntax for the additional depth intra coding modes separate from the syntax for the HEVC intra prediction modes. In addition, video decoder 300 decodes a syntax element, such as a flag, that indicates whether any of the depth intra coding modes that are different from the HEVC intra prediction modes are enabled for the 3D video data. In some examples, the syntax element may indicate whether all of the depth intra coding modes are enabled for the 3D video data. The syntax element may be included in one of a video parameter set (VPS), a sequence parameter set (SPS), or a picture parameter set (PPS) of the video data. When video decoder 300 determines that the depth intra coding modes are enabled based on the decoded syntax element, video decoder 300 decodes the depth modeling table to determine the one of the depth intra coding modes used to code the depth data. The depth modeling table may be decoded at one of a coding unit (CU) level or a prediction unit (PU) level of the video data. The signaling may reduce the parsing burden at video decoder 300 by including the depth intra coding modes in the depth modeling table separate from the HEVC intra prediction modes and indicating when the depth intra coding modes are enabled and the depth modeling table be decoded.

Figure 4A:
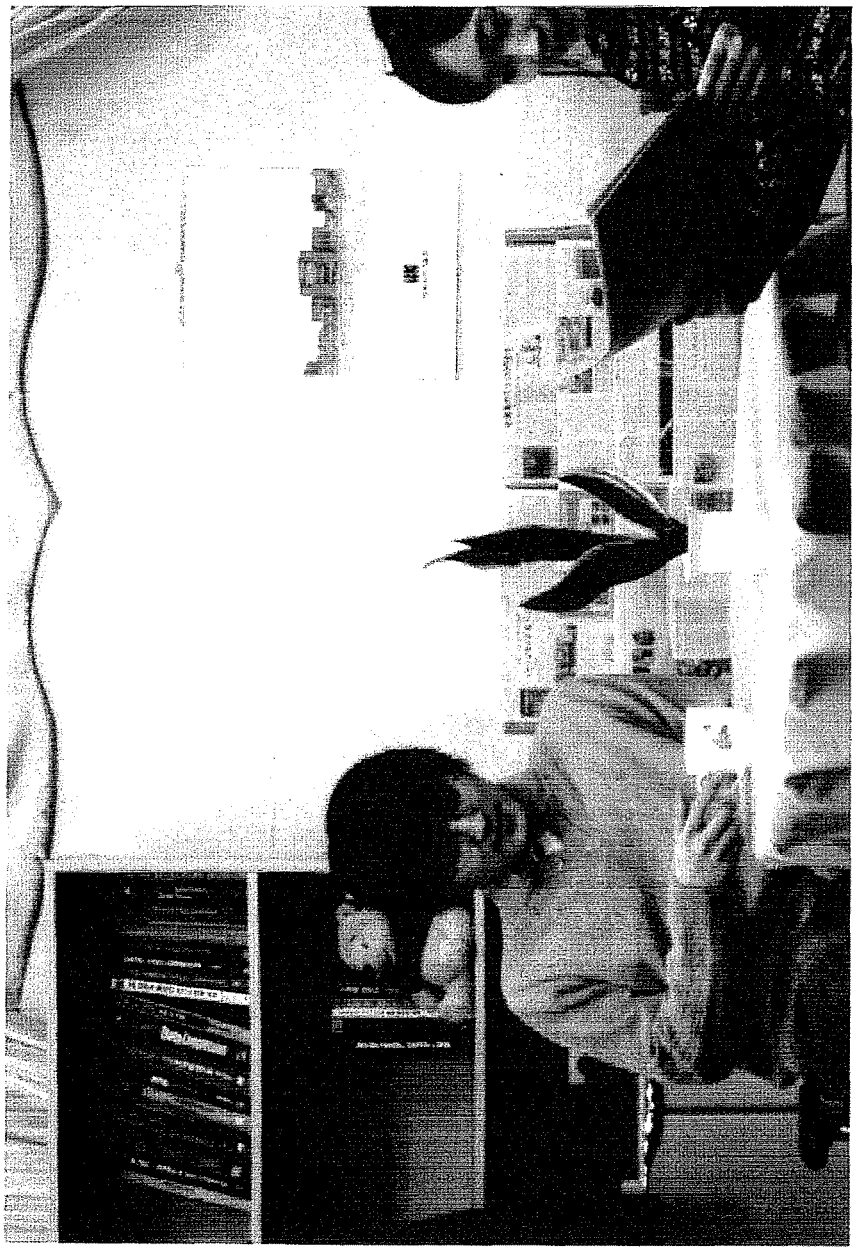
FIGS. 4A and 4B show examples of a 3D scene representation with a texture frame and a depth frame.
Figure 4B:

FIGS. 4A and 4B show examples of a 3D scene representation. The 3D scene representation includes a texture frame in FIG. 4A including texture data and a depth frame in FIG. 4B including depth data. Depth maps describing the depth data are characterized by constant areas and sharp edges that present strong correlations with corresponding texture. Conventional intra prediction modes, such as those in the HEVC standard, can be used to code the depth maps. HEVC intra prediction modes include 35 intra prediction modes containing a DC (flat) mode, a Planar (surface fitting) mode, and 33 angular modes. These intra prediction modes are well suited for texture frame compression but do not compress depth frames very efficiently. Due to different statistics and correlations between texture and corresponding depth, additional intra coding modes have been designed to improve depth frame intra compression. Examples of additional depth intra coding modes include a Depth Modeling Mode (DMM), a Simplified Depth Coding (SDC) mode, and a Chain Coding Mode (CCM). The SDC mode is also referred to as a Segment-wise Depth Coding (SDC) mode.

The DMM is adapted to the specific characteristics of depth map coding by applying nonrectangular block partitions for approximating the signal of a depth block containing an edge. A depth block is partitioned into two regions specified by a DMM pattern with each region represented by a constant value. There are two partitioning models defined in DMM—Wedgelet partitioning, in which a depth block is partitioned into two regions by a straight line, and Contour partitioning, in which a depth block is partitioned into two irregular regions. The DMM Wedgelet partitioning pattern can be either explicitly signaled ($DMM_1$), predicted by spatially neighboring blocks ($DMM_2$), or predicted by co-located texture blocks ($DMM_3$). The DMM Contour partitioning pattern can be predicted by co-located texture blocks ($DMM_4$). In other examples, the DMM may include other depth sub-modes. The DMM mode is described in 3D Video Coding with Depth Modeling Modes and View Synthesis Optimization, Karsten Müller, Philipp Merkle, Gerhard Tech, and Thomas Wiegand: *Proceedings of APSIPA Annual Summit and Conference* 2012, Hollywood, Calif., USA, December 2012.

The SDC mode is designed to more efficiently represent the depth residual for intra coded depth blocks. Instead of coding pixel-wise residual as in standard HEVC, the SDC mode codes one depth coded residual value for each segment of a Prediction Unit (PU) and skips transform and quantization. SDC was originally proposed for only a couple of modes, including the DC mode, the Planar mode, and the depth modeling modes (DMM), but can be extended to the conventional angular intra prediction modes. For each depth prediction unit coded with an intra coding mode, an encoder/decoder can adaptively choose to code pixel-wise residual or segment-wise residual to achieve better compression efficiency.

In the SDC mode, the depth values can be optionally mapped to indexes using a Depth Lookup Table (DLT), which is constructed by analyzing the frames within the first intra period before encoding the full sequence. If the DLT is used, the entire DLT is transmitted to the decoder in a sequence parameter set (SPS) and decoded index values are mapped back to depth values based on the DLT. A first DLT may be used to convert a depth value to an index value according to the DLT, and a second DLT may be used to convert an index value back to a depth value. An additional flag is signaled for each intra depth CU to specify whether the current CU is coded by the SDC mode or not. In one embodiment, the SDC mode is applied for CUs with a 2N×2N partition size. The SDC mode is described in JCT3V-B0036 (entitled "3D-CE6.h: Simplified Depth Coding with an optional Depth Lookup Table," Jager et al., Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012).

In the CCM mode, a depth block is partitioned into two regions specified by an arbitrary partition pattern that is signaled using "chains." A chain is a connection between a sample and one of its eight-connectivity samples. Each chain is assigned with a direction index and a series of connected chain indexes are signaled to define the partition pattern.

As pointed out above, RDO processing is used to choose the intra coding mode with the minimum value. Since RDO processing is very time-consuming and computationally demanding, certain processes may be implemented to limit an amount of RDO processing needed to identify an intra coding mode to apply to a PU.

Figure 5:
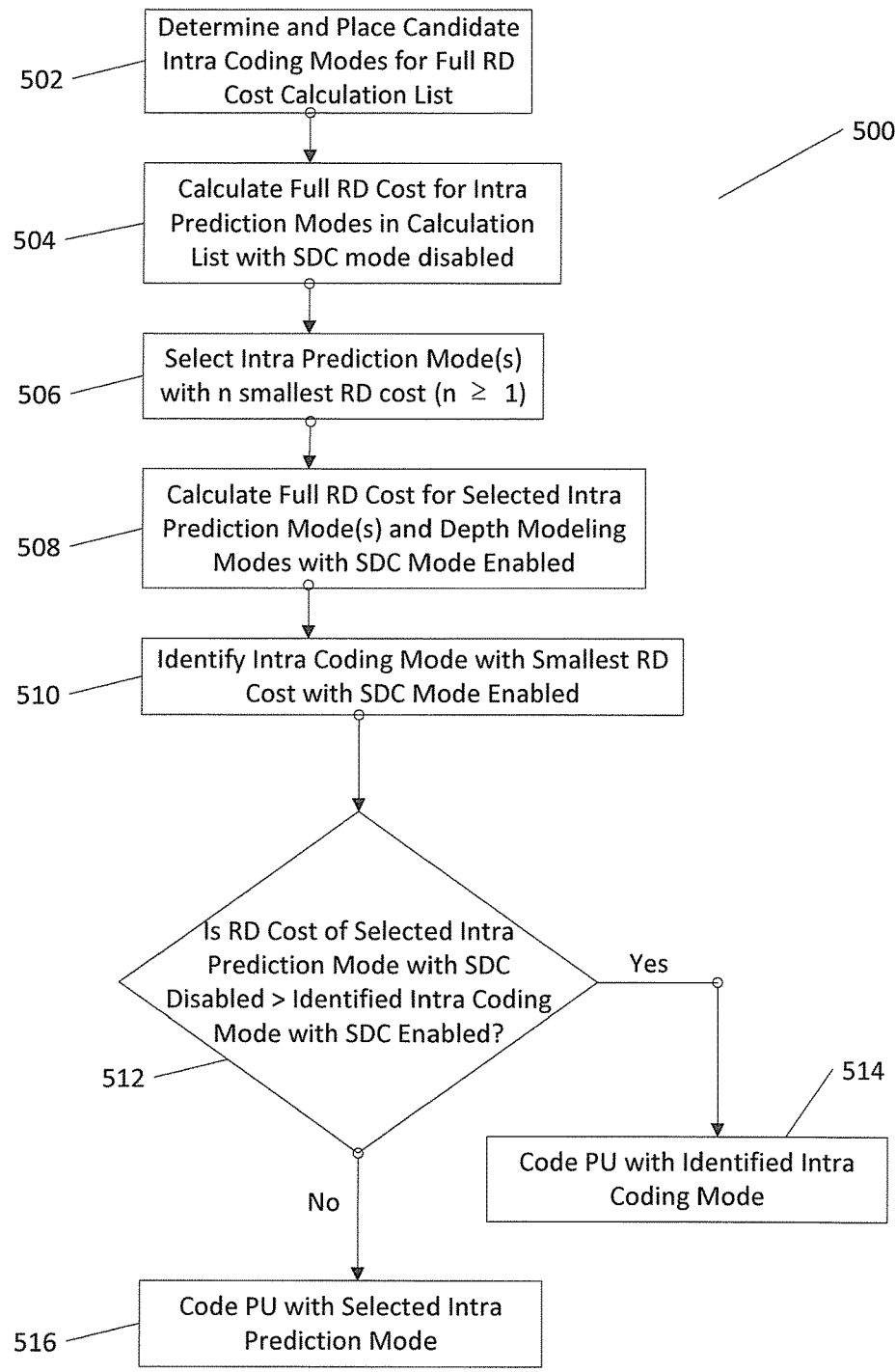
FIG. 5 shows an example of a process to reduce a computational load when enabling segment-wise depth coding (SDC)

FIG. 5 shows an example of a process 500 to reduce a computational load when enabling SDC coding. SDC can be applied to all depth intra coding modes, including HEVC intra prediction modes and Depth Modeling Modes. In normal HEVC based depth intra coding, a full RDO process is performed on both non-SDC coding modes and SDC coding modes for each PU. TABLE 1 shows a test result indicating a percentage of PUs coded with the same intra coding mode regardless of whether SDC coding was enabled or disabled. TABLE 2 shows the test configuration parameters.

TABLE 1

Test Results

| Sequence | QP = (25,34) | QP = (30,39) | QP = (35,42) |
| --- | --- | --- | --- |
| GTfly | 93.4% | 94.6% | 82.3% |
| Kendo | 91.1% | 90.6% | 93.1% |
| Newspaper | 82.0% | 88.6% | 87.6% |
| PoznanHall | 92.6% | 89.2% | 93.4% |
| PoznanStreet | 80.9% | 82.1% | 88.5% |
| Balloon | 87.5% | 87.7% | 90.5% |
| UndoDancer | 94.4% | 93.3% | 94.2% |
| Shark | 89.5% | 88.6% | 87.4% |
| Average | 88.9% | 89.3% | 89.6% |

TABLE 2

Test Configuration Parameters 8-bit input data to be used
DMM: ON
Full resolution of video and depth
Texture QP values: 40, 35, 30, 25
Depth QP values: 45, 42, 39, 34
VSO with depth fidelity term: ON
Texture SAO: ON    Depth SAO: OFF
RDQ: ON The test enabled and disabled the SDC coding option for the first 24 frames of eight testing sequences and three pairs of quantization parameters for texture and depth. As shown in Table 1, for about 90% of PUs, the same best intra coding mode is chosen regardless of whether the SDC coding option is enabled or disabled. In other words, when the SDC coding option is disabled, 90% of the best intra coding mode will also be the best intra coding mode when the SDC option is enabled. As a result, it is not necessary to compute full RD cost with the SDC option for all the intra coding modes. The best intra coding mode without the SDC option can be used as a predictor to speed up the full RD cost calculation.

Process 500 begins in block 502 by determining candidate modes from intra coding modes, including HEVC intra prediction modes and Depth Modeling Modes, for placement in a full RD cost calculation list. Other intra coding modes may also be determined and placed as desired. In one example of generating the full RD cost calculation list, prediction residuals for the HEVC prediction modes are determined and a Sum of Absolute Transform Difference (SATD) value is calculated by summing the absolute values of the DCT coefficients of the respective prediction residual for each mode. The modes with the smallest SATD values are placed in the full RD cost calculation list. In one embodiment, the full RD cost calculation list includes eight modes for 8×8 and 4×4 PU sizes and three modes for 64×64, 32×32, and 16×16 PU sizes. Other embodiments may include differing number of modes. Alternatively, the full RD cost calculation list may include all HEVC intra prediction modes and Depth Modeling Modes (and any other desired intra coding modes) without initially identifying possible candidates.

At block 504, the full RD cost is calculated for all HEVC intra prediction modes in the full RD cost calculation list with the SDC option disabled. The HEVC intra prediction mode having the smallest RD cost with the SDC option disabled is selected at block 506. A full RD cost calculation is then performed with the SDC mode enabled in block 508 on the selected HEVC intra prediction mode and any Depth Modeling Modes in the full RD cost calculation list. As the Depth Modeling Modes are specifically designed for depth map compression, it is preferable to always enable the SDC option for the Depth Modeling Modes. However, full RD cost calculations may be performed in block 504 for the Depth Modeling Modes with the HEVC intra prediction modes to find the mode with the smallest RD cost from among all modes without the SDC option.

At block 510, the intra coding mode with the smallest RD cost with the SDC option enabled is identified. A comparison is made at block 512 between the smallest RD cost for the selected intra prediction mode (determined with the SDC option disabled) and the smallest RD cost for the identified intra coding mode (determined with the SDC option enabled). If the RD cost for the selected intra prediction mode is greater than the RD cost for the identified intra coding mode, the identified intra coding mode is used to code the PU at block 514. If the RD cost for the selected intra prediction mode is not greater than the RD cost for the identified intra coding mode, the selected intra prediction mode is used to code the PU at block 516. Alternatively, if the costs are equal, coding of the PU may be performed with one of the selected mode and the identified mode as desired.

TABLEs 3 and 4 show sample test results for process 500 performed under Common Test Conditions (CTC) for the HEVC standard. TABLE 3 shows the BD rate test results for a 3-view case under CTC for an All Intra configuration. TABLE 4 shows the BD rate test results for a 3-view case under CTC for a Random Access configuration. According to the tables, no impact is made on the texture videos since process 500 is designed for depth map compression. For the All Intra case of TABLE 3, an average 17% encoding time is saved, with up to a 25% encoding time saving for the Kendo sequence. The overall BD bitrate loss is only 0.19% which is considered negligible. Virtually no impact is made on the decoding and rendering time. For the Random Access case of TABLE 4, performance change is smaller since SDC coding is only used for intra depth map coding.

TABLE 3

All Intra

|  | Video only | synthzd only | coded & synthzd | enc time | dec time | ren time |
|---|---|---|---|---|---|---|
| Balloons | 0.00% | 0.59% | 0.31% | 81.8% | 98.1% | 97.7% |
| Kendo | 0.00% | 0.72% | 0.32% | 75.4% | 104.8% | 101.3% |
| Newspaper | 0.00% | 0.82% | 0.24% | 82.0% | 105.5% | 97.4% |
| GTFly | 0.00% | −0.15% | −0.41% | 88.3% | 111.0% | 105.7% |
| PoznanHall | 0.00% | 0.55% | 0.33% | 83.7% | 106.7% | 99.5% |
| PoznanStreet | 0.00% | 0.39% | 0.06% | 84.5% | 101.9% | 99.9% |
| UndoDancer | 0.00% | 0.22% | 0.13% | 83.8% | 96.5% | 100.0% |
| Shark | 0.00% | 0.57% | 0.57% | 84.5% | 98.4% | 99.5% |
| 1024 × 768 | 0.00% | 0.71% | 0.29% | 80.1% | 102.8% | 98.8% |
| 1920 × 1088 | 0.00% | 0.32% | 0.14% | 85.0% | 102.9% | 100.9% |
| average | 0.00% | 0.46% | 0.19% | 83.0% | 102.9% | 100.1% |

TABLE 4

Random Access

|  | video only | synthzd only | coded & synthzd | enc time | dec time | ren time |
|---|---|---|---|---|---|---|
| Balloons | 0.01% | 0.12% | 0.09% | 98.7% | 100.0% | 99.8% |
| Kendo | −0.05% | 0.18% | 0.06% | 98.6% | 99.1% | 99.5% |
| Newspaper | 0.08% | 0.24% | 0.32% | 97.7% | 99.4% | 101.2% |
| GTFly | −0.05% | 0.14% | −0.20% | 96.5% | 94.0% | 97.7% |
| PoznanHall | 0.18% | 0.01% | 0.14% | 97.4% | 102.8% | 101.3% |
| PoznanStreet | −0.02% | 0.23% | 0.08% | 97.9% | 109.9% | 103.7% |
| UndoDancer | −0.09% | −0.08% | −0.06% | 96.2% | 100.5% | 95.7% |
| Shark | −0.08% | 0.03% | −0.05% | 99.1% | 100.2% | 98.4% |
| 1024 × 768 | 0.02% | 0.18% | 0.16% | 98.3% | 99.5% | 100.2% |
| 1920 × 1088 | −0.01% | 0.06% | −0.02% | 97.4% | 101.5% | 99.4% |
| average | 0.00% | 0.11% | 0.05% | 97.8% | 100.7% | 99.7% |

In another embodiment, instead of selecting the HEVC intra prediction mode having the smallest RD cost with the SDC option disabled in block 506, two or more intra prediction modes may be selected. For example, the intra prediction modes having the smallest and second smallest RD cost with the SDC option disabled may be selected for subsequent full RD cost calculation with the SDC option enabled. An integer value 'n' may be used for selection of a certain number of intra prediction modes having the smallest RD costs with the SDC option disabled.

In another embodiment, it may be desirable to perform a full RD cost calculation with the SDC option enabled in block 508 for certain intra coding modes that did not qualify as having a smallest RD cost with the SDC option disabled. One or more intra coding modes in the full RD cost calculation list may be identified for full RD cost calculation with the SDC option enabled. An integer value may be used to identify a certain number of intra coding modes in the full RD cost calculation list for full RD cost calculation with the SDC option enabled. The intra coding modes thus identified may be determined based on varying criteria, such as by order in the full RD cost calculation list, priority of intra coding modes, or any other criteria.

In another embodiment, a full RD cost calculation with SDC enabled may be limited to only certain Depth Modeling Modes, only particular HEVC intra prediction modes, or combination of certain Depth Modeling Modes and particular HEVC intra prediction modes.

Figure 6:
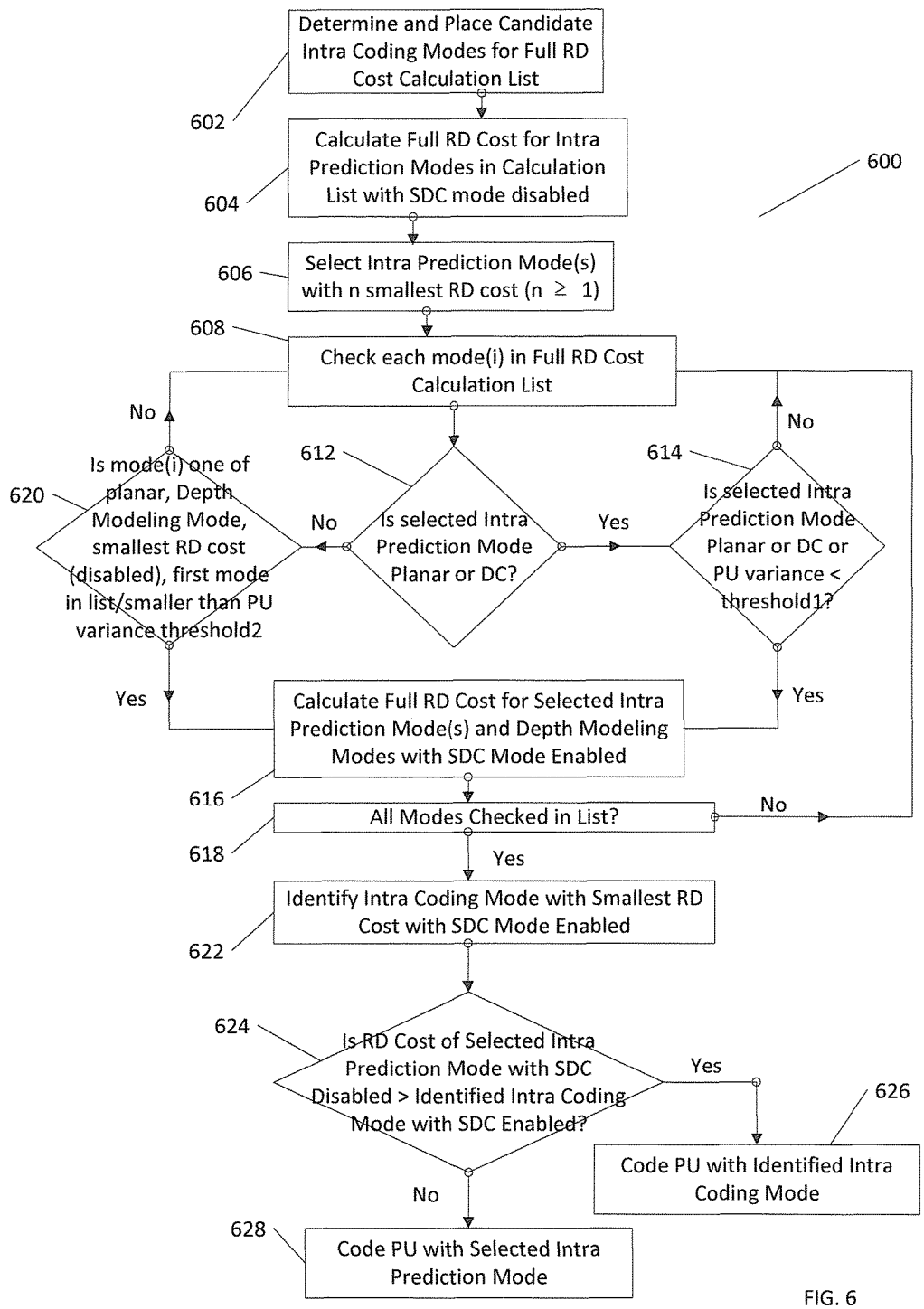
FIG. 6 shows another example of a process to reduce a computational load when enabling SDC.

FIG. 6 shows another example of a process 600 to reduce a computational load when enabling SDC coding. Process 600 begins in block 602 by determining candidate modes from HEVC intra prediction modes and Depth Modeling Modes for placement in a full RD cost calculation list. Other intra coding modes may also be included as desired. In one embodiment, the full RD cost calculation list may be populated as described above. Alternatively, the full RD cost calculation list may include all HEVC intra prediction modes and Depth Modeling Modes (and any other desired intra coding modes) without initially identifying possible candidates.

At block 604, the full RD cost is calculated for all HEVC intra prediction modes in the full RD cost calculation list with the SDC option disabled. The HEVC intra prediction mode having the smallest RD cost with the SDC option disabled is selected at block 606. One or more additional intra prediction modes, such as intra prediction modes having the second smallest and third smallest RD cost may also be selected at block 606.

An iterative process 608 is performed for each candidate mode in the full RD cost calculation list. For each candidate in the full RD cost calculation list checked at block 608, a determination is made at block 612 as to whether the intra prediction mode with the smallest RD cost is a Planar or DC intra prediction mode. If so, a determination is made at block 614 as to whether the candidate mode is a Planar or DC intra prediction mode and has a PU variance smaller than a first threshold value. If the candidate mode is not a Planar or DC intra prediction mode and the PU variance is smaller than the first threshold value, then that candidate mode is skipped and the next candidate mode from the full RD cost calculation list is checked at block 608. The PU variance may be determined by the following equation:

$$\sigma^2 = \frac{1}{N}\sum_{i=1}^{N}(x_i - \mu)^2 = \left(\frac{1}{N}\sum_{i=1}^{N}x_i^2\right) - \mu^2$$

$$\mu = \frac{1}{N}\sum_{i=1}^{N}x_i$$

where $x_i$ is a pixel value in the PU and N is the total number of pixels in the PU. In one embodiment, the first threshold value is 1.

If the candidate mode is a Planar or DC intra prediction mode or the PU variance is greater than the first threshold value at block 614, then that candidate mode is passed onto block 616 for full RD cost calculation with the SDC mode enabled. At block 618, a determination is made as to whether all candidate modes in the full RD cost calculation list have been checked. If not, the next candidate mode is processed at block 608.

If at block 612 the intra prediction mode with the smallest RD cost calculation is not Planar or DC, process flows to block 620 where the candidate mode is checked for full RD cost calculation with the SDC mode enabled. Full RD cost calculation with the SDC mode enabled is performed for those candidate modes in the full RD cost calculation list that are Planar or DC, DMM, and the number of smallest RD cost values identified in block 604. Other criteria for candidate mode full RD cost calculation with the SDC mode enabled include one or more candidate modes based on an ordering in the full RD cost calculation list and whether the PU variance is greater than a second variance threshold value. If these criteria are not met, the candidate mode is not processed for full RD cost calculation with the SDC mode enabled and the next candidate mode is checked, if there is one, through block 608. In one embodiment, the second threshold value is 4.

After all candidate modes have been checked for full RD cost calculation, the intra coding mode with the smallest RD cost with the SDC mode enabled is identified at block 622. A comparison is made at block 624 between the intra coding mode having the smallest RD cost with the SDC mode enabled and the previously determined intra prediction mode having the smallest RD cost with the SDC enabled. If the intra coding mode with the SDC mode enabled has a lower RD cost than the intra prediction mode with the SDC mode disabled, then the intra coding mode with the SDC mode enabled is applied at block 626 for the PU. If the intra coding mode with the SDC mode enabled does not have a lower RD cost than the intra prediction mode with the SDC mode disabled, then the intra prediction mode with the SDC mode disabled is applied at block 628 for the PU.

TABLEs 5 and 6 show sample test results for process 600 performed under Common Test Conditions (CTC) for the HEVC standard when three intra prediction modes with the smallest RD costs and the first mode in the RD cost calculation list in block 620, instead of the PU variance threshold, is included in full RD cost calculation with the SDC mode enabled. TABLE 5 shows the BD rate test results for a 3-view case under CTC for an All Intra configuration. TABLE 6 shows the BD rate test results for a 3-view case under CTC for a Random Access configuration. A more than 15% All Intra encoding time saving is achieved with a negligible BD bitrate loss.

TABLE 5

| | | | | All Intra | | | | | |
|---|---|---|---|---|---|---|---|---|---|
| | V0 | V1 | V2 | PSNR/Vbr | PSNR/Tbr | Synt/Tbr | enc time | dec time | ren time |
| Balloons | 0% | 0% | 0% | 0.0% | 0.1% | 0.1% | 80.8% | 96.8% | 104.7% |
| Kendo | 0% | 0% | 0% | 0.0% | 0.1% | 0.1% | 80.6% | 115.8% | 100.8% |
| Newspaper | 0% | 0% | 0% | 0.0% | 0.1% | 0.1% | 82.6% | 89.8% | 98.3% |
| GTFly | 0% | 0% | 0% | 0.0% | 0.1% | 0.1% | 83.0% | 94.3% | 92.5% |
| PoznanHll | 0% | 0% | 0% | 0.0% | 0.1% | 0.1% | 83.7% | 101.0% | 98.1% |
| PoznanSt | 0% | 0% | 0% | 0.0% | 0.0% | 0.1% | 86.0% | 102.3% | 99.7% |
| UndoDance | 0% | 0% | 0% | 0.0% | 0.0% | 0.0% | 85.7% | 112.6% | 98.0% |
| Shark | 0% | 0% | 0% | 0.0% | 0.0% | 0.1% | 85.7% | 93.8% | 103.6% |
| 1024 × 768 | 0% | 0% | 0% | 0.0% | 0.1% | 0.1% | 81.4% | 100.8% | 101.3% |
| 1920 × 1088 | 0% | 0% | 0% | 0.0% | 0.1% | 0.1% | 84.8% | 100.8% | 98.4% |
| average | 0% | 0% | 0% | 0.0% | .07% | .09% | 83.5% | 100.8% | 99.5% |

TABLE 6

| | V0 | V1 | V2 | PSNR/Vbr | PSNR/Tbr | Synt/Tbr | enc time | dec time | ren time |
|---|---|---|---|---|---|---|---|---|---|
| | | | | Random Access | | | | | |
| Balloons | 0% | 0% | 0% | 0.0% | 0.0% | 0.1% | 97.9% | 91.1% | 100.7% |
| Kendo | 0% | 0% | 0% | 0.0% | 0.1% | 0.0% | 98.1% | 91.3% | 98.6% |
| Newspaper | 0% | 0% | 0% | 0.0% | 0.1% | 0.0% | 97.6% | 91.4% | 95.5% |
| GTFly | 0% | 0% | 0% | 0.0% | 0.0% | 0.0% | 98.9% | 99.7% | 104.4 |
| PoznanHll | 0% | 0% | 0% | 0.1% | 0.1% | 0.2% | 96.9% | 102.1% | 99.1% |
| PoznanSt | 0% | 0% | 0% | 0.0% | 0.1% | 0.0% | 98.6% | 116.8% | 99.5% |
| UndoDance | 0% | 0% | 0% | 0.0% | 0.0% | 0.0% | 98.2% | 111.1% | 100.3% |
| Shark | 0% | 0% | 0% | 0.0% | 0.0% | 0.0% | 99.1% | 87.2% | 105.2% |
| 1024 × 768 | 0% | 0% | 0% | 0.0% | 0.0% | 0.0% | 97.8% | 91.3% | 98.3% |
| 1920 × 1088 | 0% | 0% | 0% | 0.0% | 0.1% | 0.1% | 98.3% | 103.4% | 101.7% |
| average | 0% | 0% | 0% | .01% | .05% | .05% | 98.2% | 98.8% | 100.4% |

TABLEs 7 and 8 show sample test results for process 600 performed under Common Test Conditions (CTC) for the HEVC standard when three intra prediction modes with the smallest RD costs and the PU variance threshold in block 620, instead of the first mode in the full RD calculation list, is included in full RD cost calculation with the SDC mode enabled. TABLE 7 shows the BD rate test results for a 3-view case under CTC for an All Intra configuration. TABLE 8 shows the BD rate test results for a 3-view case under CTC for a Random Access configuration. On average, a more than 10% All Intra encoding time saving is achieved with a negligible BD bitrate loss.

TABLE 7

| | V0 | V1 | V2 | PSNR/Vbr | PSNR/Tbr | Synt/Tbr | enc time | dec time | ren time |
|---|---|---|---|---|---|---|---|---|---|
| | | | | All Intra | | | | | |
| Balloons | 0% | 0% | 0% | 0.0% | 0.0% | 0.0% | 89.7% | 103.6% | 99.0% |
| Kendo | 0% | 0% | 0% | 0.0% | 0.0% | 0.0% | 88.6% | 102.4% | 101.6% |
| Newspaper | 0% | 0% | 0% | 0.0% | 0.0% | 0.0% | 93.0% | 102.9% | 100.9% |
| GTFly | 0% | 0% | 0% | 0.0% | 0.0% | 0.0% | 91.9% | 97.0% | 107.1% |
| PoznanHll | 0% | 0% | 0% | 0.0% | 0.0% | 0.0% | 85.7% | 98.1% | 101.2% |
| PoznanSt | 0% | 0% | 0% | 0.0% | 0.0% | 0.0% | 92.3% | 98.7% | 99.2% |
| UndoDance | 0% | 0% | 0% | 0.0% | 0.0% | 0.0% | 87.6% | 105.3% | 99.8% |
| Shark | 0% | 0% | 0% | 0.0% | 0.0% | 0.0% | 90.6% | 103.9% | 103.2% |
| 1024 × 768 | 0% | 0% | 0% | 0.0% | 0.0% | 0.0% | 90.4% | 103.0% | 100.5% |
| 1920 × 1088 | 0% | 0% | 0% | 0.0% | 0.0% | 0.0% | 89.6% | 100.6% | 102.1% |
| average | 0% | 0% | 0% | 0.0% | .01% | .01% | 89.9% | 101.5% | 101.5% |

TABLE 8

| | V0 | V1 | V2 | PSNR/Vbr | PSNR/Tbr | Synt/Tbr | enc time | dec time | ren time |
|---|---|---|---|---|---|---|---|---|---|
| | | | | Random Access | | | | | |
| Balloons | 0% | 0% | 0.2% | 0.0% | 0.0% | 0.0% | 98.9% | 93.6% | 101.9% |
| Kendo | 0% | −0.2% | 0% | 0.0% | −0.1% | −0.1% | 98.6% | 92.4% | 100.0% |
| Newspaser | 0% | 0% | 0.1% | 0.0% | 0.0% | −0.1% | 99.5% | 108.9% | 102.6% |
| GTFly | 0% | 0% | 0% | 0.0% | 0.0% | 0.0% | 99.3% | 105.1% | 99.3% |
| PoznanHll | 0% | −0.1% | −0.2% | −0.1% | −0.1% | 0.2% | 98.0% | 105.3% | 99.7% |
| PoznanSt | 0% | 0.1% | 0% | 0.0% | 0.0% | 0.0% | 98.9% | 88.6% | 99.8% |
| UndoDance | 0% | −0.1% | −0.1% | 0.0% | 0.0% | 0.0% | 98.3% | 93.2% | 98.2% |
| Shark | 0% | −0.1% | 0% | 0.0% | 0.0% | 0.0% | 99.1% | 104.9% | 98.9% |
| 1024 × 768 | 0% | 0% | 0.1% | 0.0% | 0.0% | 0.0% | 99.0% | 98.3% | 101.5% |
| 1920 × 1088 | 0% | −0.1% | −0.1% | 0.0% | 0.1% | 0.1% | 98.7% | 99.4% | 99.2% |
| average | 0% | −.05% | −.02% | −.02% | −.02% | −.01% | 98.8% | 99.0% | 100.1% |

Figure 7:
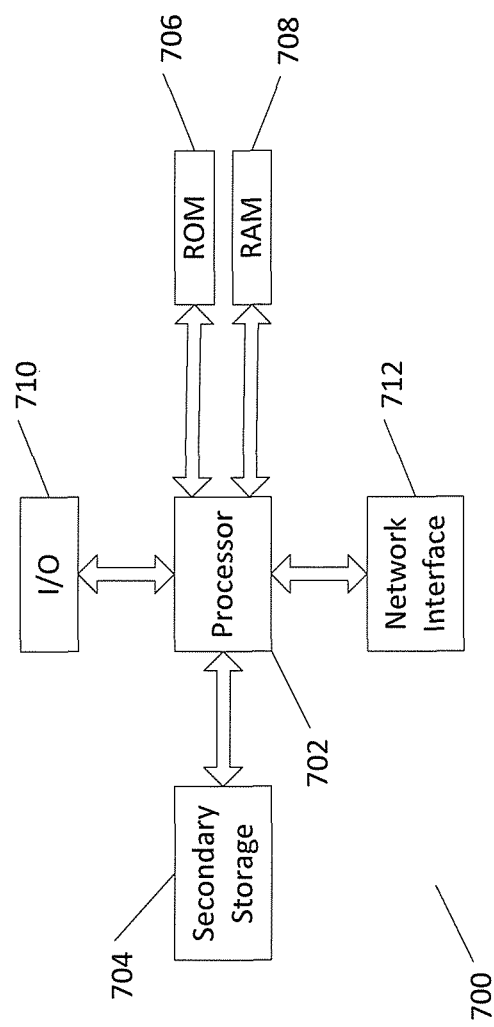
FIG. 7 illustrates a simplified, general-purpose computing component suitable for performing the processes of FIGS. 5 and 6.

FIG. 7 illustrates a simplified, general-purpose computing component 700 suitable for implementing one or more embodiments disclosed herein. The components described above for video encoder 200 and video decoder 300 may be implemented on any general-purpose computing component, such as a computer or network component with sufficient processing power, memory resources, and network throughput capability to handle the necessary workload placed upon it. The computing component 700 includes a processor 702 (which may be referred to as a central processor unit or CPU) that is in communication with memory devices including secondary storage 704, read only memory (ROM) 706, random access memory (RAM) 708, input/output (I/O) devices 710, and network/component connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704. Additional processors and memory devices may be incorporated based on the function of each component within video encoder 200 and video decoder 300.

In summary, by exploring a strong correlation between the best intra coding mode with and without SDC, unnecessary SDC full RD cost calculations can be avoided by using the best intra prediction mode without SDC as a predictor. Considerable time saving can be achieved with negligible bitrate loss. Various techniques for simplifying coding mode determination of depth maps consistent with 3D-HEVC have been described in relation to depth intra coding modes, including depth modeling mode (DMM), a simplified depth coding (SDC) mode, and a chain coding mode (CCM). The techniques may further be extended to other depth intra coding modes and depth inter coding modes, such as an Inter SDC mode.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A method for reducing a computational load in high efficiency video coding, comprising:
    generating a full rate distortion (RD) cost calculation list of selected intra coding modes, the intra coding modes including intra prediction modes and depth modeling modes;
    determining a RD cost for each intra prediction mode in the full RD cost calculation list wherein a segment-wise depth coding (SDC) mode for encoding image depth data is disabled for each intra prediction mode in the determination;
    selecting a smallest RD cost intra prediction mode having a smallest RD cost;
    calculating a RD cost for a particular intra prediction mode with the SDC mode enabled;
    comparing the RD cost of the particular intra prediction mode obtained for the SDC mode being enabled and the RD cost of the selected intra prediction mode having SDC mode disabled to determine which RD cost is smaller; and
    applying, to a prediction unit, one of the particular intra prediction mode having SDC mode enabled and the selected intra prediction mode having SDC mode disabled based on the smaller RD cost.

2. The method of claim 1, further comprising:
    applying a checking condition to determine whether to calculate the RD cost for the particular intra prediction mode with the SDC mode enabled.

3. The method of claim 2, wherein the checking condition comprises any one of:
    checking whether the selected intra prediction mode is a depth modeling mode;
    checking whether the selected intra prediction mode is a DC mode;
    checking whether the selected intra prediction mode is a Planar mode;
    checking whether the selected intra prediction mode is as same as any one of three modes occurring before other intra prediction modes in the full RD cost calculation list.

4. The method of claim 2, wherein the checking condition comprises checking a block variance with a threshold value.

5. The method of claim 2, wherein calculating the RD cost for a particular intra prediction mode with the SDC mode enabled is not performed for a certain checking condition.

6. The method of claim 1, further comprising:
    selecting a second intra prediction mode having a second smallest RD cost and including the second intra prediction mode in the calculation and comparison steps; or
    selecting a second intra prediction mode having a third smallest RD cost and including the third intra prediction mode in the calculation and comparison steps; or
    selecting a second intra prediction mode from the full RD cost calculation list despite not having the smallest RD cost and including the second intra prediction mode in the calculation and comparison steps.

7. The method of claim 6, wherein the second intra prediction mode is a first entry in the full RD cost calculation list, or the second intra prediction mode is a second entry in the full RD cost calculation list, or the second intra prediction mode is a third entry in the full RD cost calculation list.

8. The method of claim 1, further comprising:
    determining whether to calculate the RD cost for the particular intra prediction mode in response to the selected intra prediction mode being a planar or DC intra prediction mode.

9. The method of claim 1, further comprising:
    determining whether to calculate the RD cost for the particular intra prediction mode in response to a prediction unit variance being greater than a threshold value.

10. A device for reducing a computational load in high efficiency video coding, comprising:
- a memory configured to store data and instruction code;
- a processor, upon executing the instruction code, configured to: generate a full rate distortion (RD) cost calculation list of selected intra coding modes, the intra coding modes including intra prediction modes and depth modeling modes;
  - determine a RD cost for each intra prediction mode in the full RD cost calculation list, wherein a segment-wise depth coding (SDC) mode for encoding image depth data is disabled for each intra prediction mode in the determination;
  - select a smallest RD cost intra prediction mode having a smallest RD cost;
  - calculate a RD cost for a particular intra prediction mode with the SDC mode enabled;
  - compare the RD cost of the particular intra prediction mode obtained for SDC mode being enabled and the RD cost of the selected intra prediction mode having SDC mode disabled to determine which RD cost is smaller; and
  - apply, to a prediction unit, one of the particular intra prediction mode having SDC mode enabled and the selected intra prediction mode having SDC mode disabled based on the smaller RD cost.

11. The device of claim 10, wherein the processor is further configured to:
- apply a checking condition to determine whether to calculate the RD cost for the selected intra prediction mode with the SDC mode enabled.

12. The device of claim 11, wherein the checking condition comprises any one of:
- checking whether the selected intra prediction mode is a depth modeling mode;
- checking whether the selected intra prediction mode is a DC mode;
- checking whether the selected intra prediction mode is a Planar mode;
- checking whether the selected intra prediction mode is as same as any one of three modes occurring before other intra prediction modes in the full RD cost calculation list.

13. The device of claim 11, wherein the checking condition comprises checking a block variance with a threshold value.

14. The device of claim 11, wherein calculating the RD cost for the particular intra prediction mode with the SDC mode enabled is not performed for a certain checking condition.

15. The device of claim 10, wherein the processor is further configured to:
- select a second intra prediction mode having a second smallest RD cost and including the second intra prediction mode in the calculation and comparison steps; or
- select a second intra prediction mode having a third smallest RD cost and including the third intra prediction mode in the calculation and comparison steps; or
- select a second intra prediction mode from the full RD cost calculation list despite not having the smallest RD cost and including the second intra prediction mode in the calculation and comparison steps.

16. The device of claim 15, wherein the second intra prediction mode is a first entry in the full RD cost calculation list, or the second intra prediction mode is a second entry in the full RD cost calculation list, or the second intra prediction mode is a third entry in the full RD cost calculation list.

17. The device of claim 10, herein the processor is further configured to:
- determine whether to calculate the RD cost for the selected intra prediction mode in response to the selected intra prediction mode being a planar or DC intra prediction mode.

18. The device of claim 10, wherein the processor is further configured to:
- determine whether to calculate the RD cost for the selected intra prediction mode in response to a prediction unit variance being greater than a threshold value.

19. A non-transitory computer readable medium including code for reducing a computational load in high efficiency video coding, the code upon being executed operable to:
- generate a full rate distortion (RD) cost calculation list of selected intra coding modes, the intra coding modes including intra prediction modes and depth modeling modes;
- determine a RD cost for each intra prediction mode in the full RD cost calculation list, wherein a segment-wise depth coding (SDC) mode for encoding image depth data is disabled for each intra prediction mode in the determination;
- select a smallest RD cost intra prediction mode having a smallest RD cost;
- calculate a RD cost for a particular intra prediction mode with the SDC mode enabled;
- compare the RD cost of the particular intra prediction mode obtained for the SDC mode being enabled and the RD cost of the selected intra prediction mode having SDC mode disabled to determine which distortion cost is smaller; and
- apply, to a prediction unit, one of the particular intra prediction mode having SDC mode enabled and the selected intra prediction mode having SDC mode disabled based on the smaller RD cost.

20. The non-transitory computer readable medium of claim 19, wherein the code is further operable to:
- apply a checking condition to determine whether to calculate the RD cost for the particular intra prediction mode with the SDC mode enabled;
- wherein the checking condition comprises any one of:
  - checking whether the selected intra prediction mode is a depth modeling mode;
  - checking whether the selected intra prediction mode is a DC mode;
  - checking whether the selected intra prediction mode is a Planar mode;
  - checking whether the selected intra prediction mode is as same as any one of three modes occurring before other intra prediction modes in the full RD cost calculation list;
  - checking a block variance with a threshold value.

21. The non-transitory computer readable medium of claim 19, wherein the code is further operable to:
- select a second intra prediction mode having a second smallest RD cost and including the second intra prediction mode in the calculation and comparison steps; or
- select a second intra prediction mode having a third smallest RD cost and including the third intra prediction mode in the calculation and comparison steps; or
- select a second intra prediction mode from the full RD cost calculation list despite not having the smallest RD cost and including the second intra prediction mode in the calculation and comparison steps.

22. The non-transitory computer readable medium of claim 21, wherein the second intra prediction mode is a first entry in the full RD cost calculation list, or the second intra prediction mode is a second entry in the full RD cost calculation list, or the second intra prediction mode is a third entry in the full RD cost calculation list.

* * * * *

UNITED STATES PATENT AND TRADEMARK OFFICE
CERTIFICATE OF CORRECTION

PATENT NO. : 10,085,028 B2
APPLICATION NO. : 14/752043
DATED : September 25, 2018
INVENTOR(S) : Gu et al.

Page 1 of 1

It is certified that error appears in the above-identified patent and that said Letters Patent is hereby corrected as shown below:

In the Drawings

Sheet 2 of 8, Fig. 2, the reference numeral 240 should be applied to the block labeled 'Deblock Filter'

In the Specification

In Column 4, Line 59, delete "20" and insert --200-- therefor

In the Claims

In Column 22, Line 3, in Claim 17, delete "herein" and insert --wherein-- therefor Signed and Sealed this
Twenty-second Day of December, 2020

Andrei Iancu
*Director of the United States Patent and Trademark Office*